(12) United States Patent
Jung

(10) Patent No.: US 8,446,036 B2
(45) Date of Patent: May 21, 2013

(54) MULTI-OUTPUT POWER SUPPLY DEVICE

(75) Inventor: Jee-hoon Jung, Yongin-si (KR)

(73) Assignee: Samsung Electronics, Co., Ltd., Suwon-Si (KR)

( * ) Notice: Subject to any disclaimer, the term of this patent is extended or adjusted under 35 U.S.C. 154(b) by 0 days.

(21) Appl. No.: 13/326,881

(22) Filed: Dec. 15, 2011

(65) Prior Publication Data

US 2012/0086271 A1   Apr. 12, 2012

Related U.S. Application Data

(63) Continuation of application No. 12/805,678, filed on Aug. 12, 2010, now Pat. No. 8,097,977, which is a continuation of application No. 12/023,226, filed on Jan. 31, 2008, now Pat. No. 7,791,222.

(30) Foreign Application Priority Data

Jun. 15, 2007   (KR) .................................. 2007-59126

(51) Int. Cl.
*H02J 3/00*   (2006.01)
(52) U.S. Cl.
USPC ................... 307/17; 307/32; 307/98; 307/99; 307/126; 307/129
(58) Field of Classification Search
USPC ........................ 307/17, 32, 98, 99, 126, 129
See application file for complete search history.

(56) References Cited

U.S. PATENT DOCUMENTS

| 4,849,874 | A |   | 7/1989 | Buck et al. |
| 4,996,562 | A | * | 2/1991 | Mizude ............................ 399/13 |
| 5,453,678 | A |   | 9/1995 | Bertolini et al. |
| 6,038,150 | A |   | 3/2000 | Yee et al. |

FOREIGN PATENT DOCUMENTS

| JP | 08080037 A | 3/1996 |
| JP | 2001320253 A | 11/2001 |

OTHER PUBLICATIONS

Notice of Allowance dated Apr. 22, 2010 for related U.S. Appl. No. 12/023,226.
Office Action issued in related U.S. Appl. No. 12/805,678 dated Jan. 31, 2011.
Notice of Allowance dated Sep. 15, 2011 for related U.S. Appl. No. 12/805,678.
U.S. Appl. No. 12/805,678, filed Aug. 12, 2010, Jee-hoon Jung, Samsung Electronics Co., Ltd.
U.S. Appl. No. 12/023,226, filed Jan. 31, 2008, Jee-hoon Jung, Samsung Electronics Co., Ltd.
Korean Office Action issued Oct. 18, 2012 in corresponding Korean Patent Application No. 10-2008-0014913.

* cited by examiner

*Primary Examiner* — Hal Kaplan
(74) *Attorney, Agent, or Firm* — Staas & Halsey LLP

(57) ABSTRACT

A method of controlling a plurality of output voltages in a multi-output power supply device for generating a plurality of output powers by using a transformer. The method includes, if a system to which power is supplied from the multi-output power supply device is in a standby mode, blocking any one of at least two output powers of a secondary side of the transformer, wherein the blocked power is supplied to the system; and compensating for a resistance of a feedback circuit connected to a switching controller of a power switch of a primary side of the transformer in relation to one or more unblocked output powers of the transformer and maintaining the output of the unblocked output power to be constant.

17 Claims, 3 Drawing Sheets

MULTI-OUTPUT POWER SUPPLY DEVICE

CROSS-REFERENCE TO RELATED APPLICATIONS

This application is a continuation application of U.S. application Ser. No. 12/805,678 filed Aug. 12, 2010, which issued as U.S. Pat. No. 8,097,977 which is a continuation of U.S. application Ser. No. 12/023,226 filed Jan. 31, 2008, which issued as U.S. Pat. No. 7,791,222, which claims the benefit of Korean Application No. 2007-59126, filed Jun. 15, 2007, in the Korean Intellectual Property Office, the disclosures of which are incorporated herein by reference.

BACKGROUND

1. Field

Aspects of the present invention relate to a multi-output power supply device, and more particularly, to a multi-output power supply device which, when power supplied to one output circuit of multiple output circuits is blocked, stably controls power output to other output circuits of the multiple output circuits.

2. Description of the Related Art

To obtain multiple output voltages from a low-capacity power supply device, a single converter using a single transformer is widely used to generate the multiple output voltages. Since the single converter only uses a single controller, the single converter employs a multi-output sensing (or feedback) circuit that observes and controls output of the multiple output voltages. However, when the feedback circuit is used for a power supply device that is able to switch off some of the multiple output voltages in order to reduce use of standby power during a standby mode, voltages of non-switched off output voltages cannot be controlled within a desired range.

FIG. 1 is a block diagram of a typical multi-output power supply device. Referring to FIG. 1, power is provided to a transformer 14 according to a switching operation of a first power switch 10 that is controlled by a first switch controller 12. The transformer 14 transforms the provided power according to its turn ratio and outputs a transformed power to a first output circuit 16 and a second output circuit 18. If required, the typical multi-output power supply device can have additional output circuits similar to the first output circuit 16 and a second output circuit 18 shown.

The first output circuit 16 outputs the transformed power supplied from the transformer 14 to a subsidiary load 24 and the second output circuit 18 outputs the transformed power to a second power switch 20 that switches the transformed power to a main load 26 according to a control of the second power switch 20. The respective transformed powers output from the first and second output circuits 16 and 18 pass through a feedback circuit 28 and are fed back as signals for controlling the first switch controller 12.

Power switching-off at a secondary side of the transformer 14 is used to restrain unnecessary load power consumption in or during the standby mode. In the standby mode, a standby mode controller of the subsidiary load 24 turns off the second power switch 20 to restrain power supply to the main load 26. Furthermore, in the standby mode, a value of the subsidiary load 24 is also minimized by a system power sequence, and the typical multi-output power supply device operates with the standby mode controller as a central element that senses an external interrupt to detect when the standby mode is converted into a normal mode.

When the typical multi-output power supply device is controlled using a single controller, however, an output voltage of a switched off output circuit from among the multiple output circuits of the power supply device cannot be observed (or determined) so that an error in controlling of the other output voltages is increased. This causes output voltages error to deteriorate control characteristics of the typical multi-output power supply device and to excessively increase the output voltages of the power supply devices so as to destroy a load.

SUMMARY

Aspects of the present invention provide a multi-output power supply device which, when power applied to one output circuit of the multiple output circuits is blocked, stably controls power output to remaining output circuits of the multiple output circuits.

According to an aspect of the present invention, a multi-output power supply device includes: a first power switch to perform a switching operation of a power supply; a first switch controller to control the first power switch; a transformer to transform the power supplied from the first power switch; first through Nth output circuits connected to a secondary side of the transformer, where N is a positive integer greater than 1; a second power switch to switch the power output from one of the first through Nth output circuits; a second switch controller to control the second power switch; a feedback circuit to feed back output voltages of the first through Nth output circuits; and a feedback compensation circuit to perform a switching operation complementarily with the second power switch to compensate for a resistance of the feedback circuit.

According to an aspect of the present invention, the feedback circuit includes a plurality of resistors to observe the output voltages of the first through Nth output circuits, and the feedback compensation circuit may be connected in parallel with one of the plurality of resistors.

According to an aspect of the present invention, the feedback circuit includes a reference resistor, and the feedback compensation circuit may be connected in parallel with the reference resistor.

According to an aspect of the present invention, the feedback compensation circuit may comprise a compensation switch to perform an off switching operation if the second power switch is on and carry out an on switching operation if the second power switch is off, and a compensation resistor serially connected to the compensation switch.

According to an aspect of the present invention, a multi-output power supply device includes a first power switch to perform a switching operation of a power supply, a first switch controller to control the first power switch; a transformer to transform the power supplied from the first power switch; first through Nth output circuits connected to a secondary side of the transformer, wherein N is a positive integer greater than 1; a second power switch to switch the power output from one of the first through Nth output circuits; a second switch controller to control the second power switch; a feedback circuit to feed back output voltages of the first through Nth output circuits, the feedback circuit containing a reference resistor and a plurality of resistors corresponding to the first through Nth output circuits; and a feedback compensation circuit to perform an opposite switching operation relative to the second power switch to compensate for a resistance of the feedback circuit.

According to an aspect of the present invention, a multi-output power supply device includes a first output circuit to output a first output voltage using an input voltage; a second output circuit to output a second output voltage using the input voltage; a power switch to control supply of the second output voltage to a load; a feedback circuit to output a signal used to control supply of the input voltage using the first output voltage received from the first output circuit and the second output voltage selectively received from the power switch; and a feedback compensation circuit to compensate for a resistance of the feedback circuit when the second output voltage is not received from the power switch.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which

DETAILED DESCRIPTION OF THE EMBODIMENTS

Figure 1:
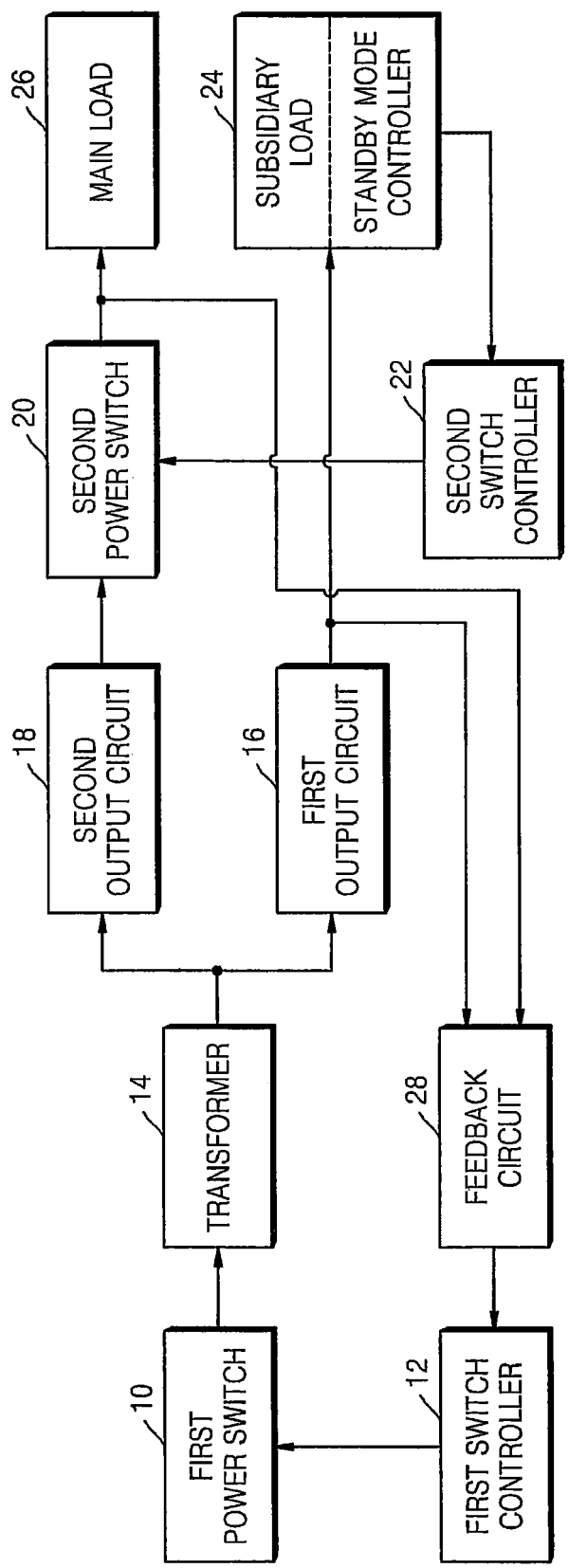
FIG. 1 is a block diagram of a typical multi-output power supply device.

Reference will now be made in detail to aspects of the present invention, examples of which are illustrated in the accompanying drawings, wherein like reference numerals refer to the like elements throughout. The aspects are described below in order to explain the present invention by referring to the figures.

Figure 2:
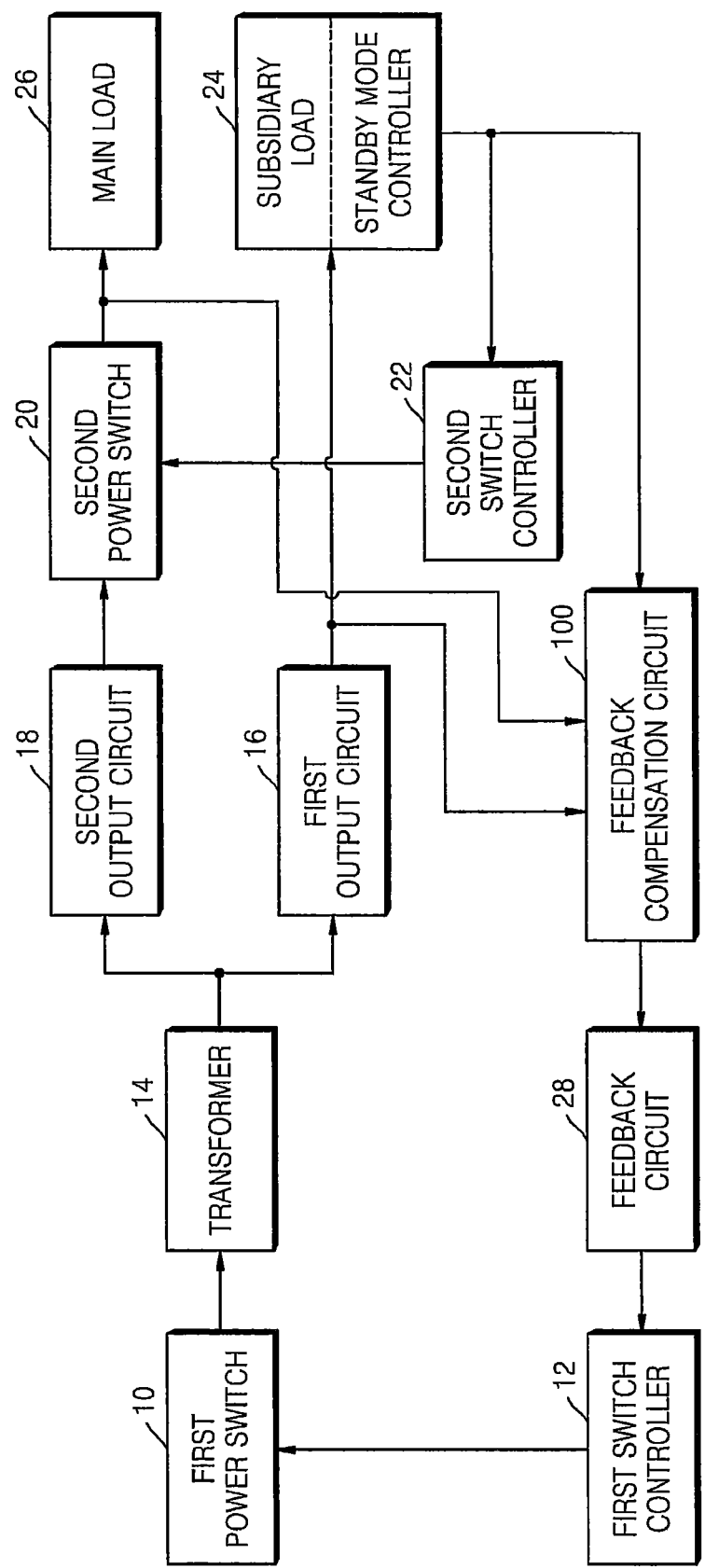
FIG. 2 is a block diagram of a multi-output power supply device according to an aspect of the present invention.

FIG. 2 is a block diagram of a multi-output power supply device according to an aspect of the present invention. Referring to FIG. 2, the multi-output power supply device includes a first power switch 10 that switches a supply of power, a first switch controller 12 that controls the first power switch 10, a transformer 14 that transforms the power supplied from the first power switch 10, a first output circuit 16 and a second output circuit 18 that are connected to a secondary side of the transformer 14, a second power switch 20 that switches a supply of power output from the second output circuit 18, a second switch controller 22 that controls the second power switch 20, and a feedback circuit 28 that feeds back output voltages of the first and second output circuits 16 and 18. In aspects of the present embodiment, though the multi-output power supply device is shown having the first and second output circuits 16 and 18, aspects of the present invention are not limited thereto. That is, the multi-output power supply device can include a plurality of output circuits (i.e., N output circuits, where N is a natural number greater than 1). The aforementioned components of the multi-output power supply device are identical to those of the typical multi-output power supply device illustrated in FIG. 1 so that detailed explanations thereof are omitted.

Unlike the typical multi-output power supply device illustrated in FIG. 1, the multi-output power supply device according to an aspect of the present invention further includes a feedback compensation circuit 100 to compensate for a resistance of the feedback circuit 28. Thus, the feedback compensation circuit 100 and the second power switch 20 complementarily perform switching operations, as further described below.

Figure 3:
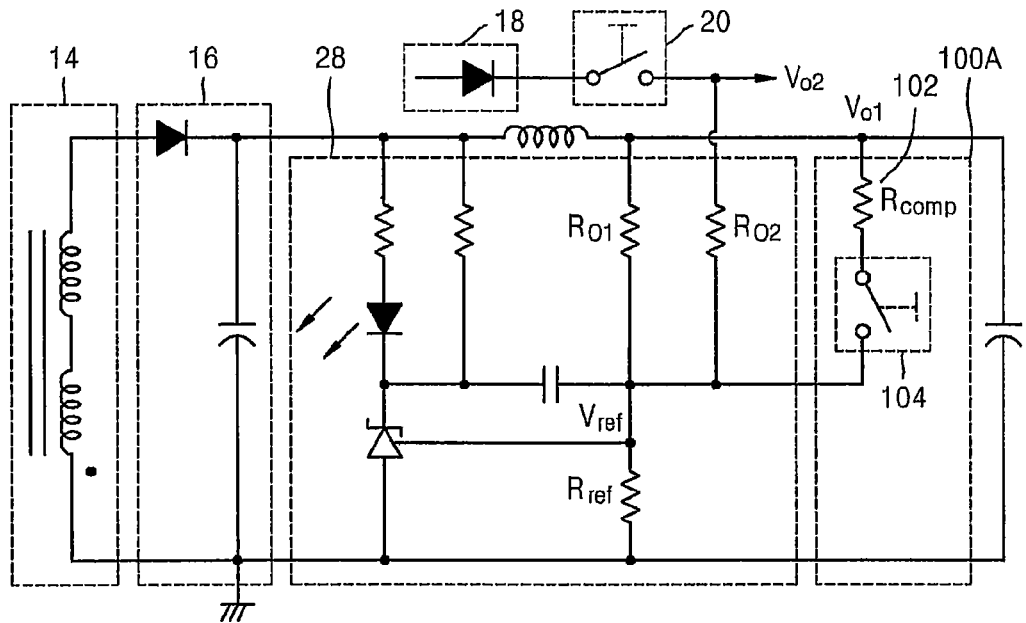
FIG. 3 is a circuit diagram of a multi-output power supply device according to an aspect of the present invention that includes an aspect of a feedback compensation circuit illustrated in FIG. 2.

FIG. 3 is a circuit diagram of a multi-output power supply device according to an aspect of the present invention that includes an aspect of the feedback compensation circuit 100 illustrated in FIG. 2. Referring to FIG. 3, a feedback compensation circuit 100A is connected in parallel with a resistor $R_{O1}$ used to observe (or detect) an output voltage $V_{O1}$ of the first output circuit 16. The resistor $R_{O1}$ is included in the feedback circuit 28.

The feedback compensation circuit 100A includes a compensation resistor $R_{comp}$ 102 and a compensation switch 104 such that the compensation resistor $R_{comp}$ is serially connected to the compensation switch 104. The compensation switch 104 performs an off switching operation if the second power switch 20 is on, and carries out an on switching operation if the second power switch 20 is off.

When a system employing the multi-output power supply device of FIG. 3 is in a normal operation mode, the second power switch 20 maintains an on state and the compensation switch 104 performs the off switching operation. Accordingly, the feedback compensation circuit 100A does not operate. If the system is in a standby mode, the second power switch 20 is converted into an off state and the compensation switch 104 performs the on switching operation. Accordingly, the observation resistor $R_{O1}$ and the compensation resistor $R_{comp}$ are connected in parallel to each other, and thus, an impedance (or resistance) for observing an output voltage $V_{O1}$ of the first output circuit 16 is compensated, and then, an output voltage of the multi-output power supply device is uniformly maintained. Consequently, a voltage error observed by the feedback circuit 28 due to erroneous feed back of the output voltage $V_{O1}$ from the first output circuit 16, which is caused by the switching-off of the second output circuit 18, can be compensated. That is, a voltage error, observed by a feedback circuit due to an erroneous feed back of an output voltage from a non switched off output circuit that is caused by a switched off output circuit, can be compensated. In various aspects, one or more of the output circuits may be switched off in the standby mode.

In the aspect shown in FIG. 3, if values of the resistor $R_{O1}$ for observing the output voltage $V_{O1}$ of the first output circuit 16, a resistor $R_{O2}$ for observing the output voltage $V_{O2}$ of the second output circuit 18, and a reference resistor $R_{ref}$ for a reference voltage $V_{ref}$ for the feedback circuit 28, have values represented by Equation 1, the value of the compensation resistor $R_{comp}$ is determined by Equation 2.

$$R_{O1} = \frac{(V_{O1} - V_{ref})R_{ref}}{X V_{ref}}, R_{O2} = \frac{(V_{O2} - V_{ref})R_{ref}}{(1-X)V_{ref}} \quad \text{[Equation 1]}$$

Here, X denotes a feedback weight factor, and $I_{ref}$ is a value a value of a reference current of the feedback circuit 28.

$$R_{comp} = \frac{(V_{O1} - V_{ref})R_{O1}}{R_{O1}I_{ref} - V_{O1} + V_{ref}} \quad \text{[Equation 2]}$$

Figure 4:
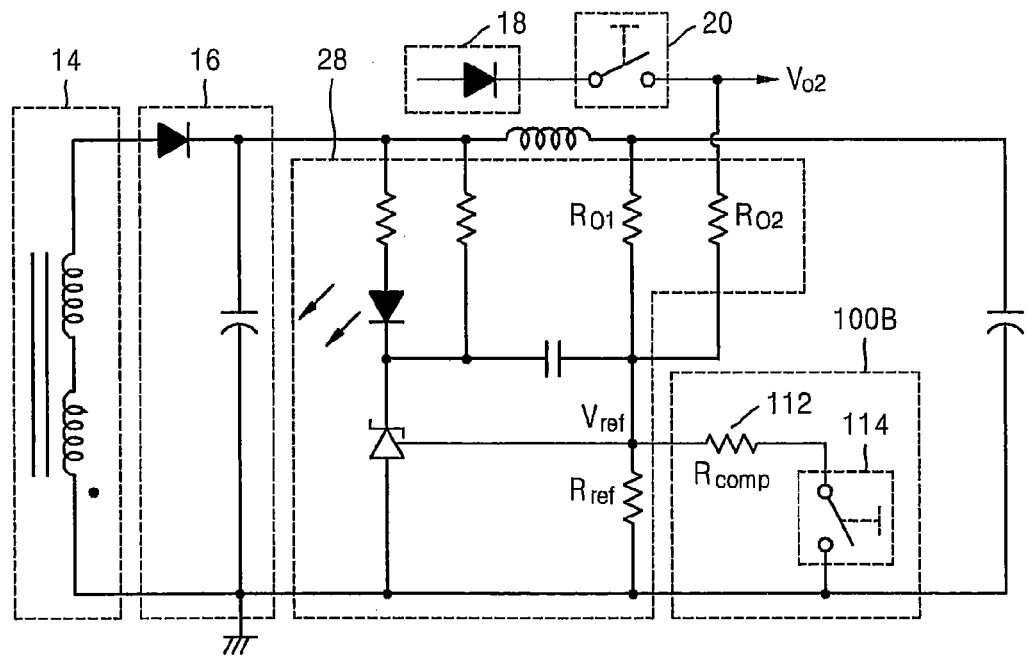
FIG. 4 is a circuit diagram of a multi-output power supply device according to another aspect of the present invention that includes an aspect of the feedback compensation circuit illustrated in FIG. 2.

FIG. 4 is a circuit diagram of a multi-output power supply device according to an aspect of the present invention that includes an aspect of the feedback compensation circuit 100 illustrated in FIG. 2. Referring to FIG. 4, a feedback compensation circuit 100B is connected in parallel with a reference resistor $R_{ref}$ of the feedback circuit 28 that includes a compensation resistor $R_{comp}$ 112 and a compensation switch 114. The compensation resistor $R_{comp}$ 112 is serially connected to the compensation switch 114 that performs an off switching operation when the second power switch 20 is on, and carries out an on switching operation when the second power switch 20 is off.

If a system employing the multi-output power supply device is in a normal operation mode, the second power switch 20 is in on state and the compensation switch 114 performs the off switching operation, and thus, the compensation circuit 114 does not operate. If the system is in a standby mode, the second power switch 20 is converted into an off state and the compensation switch 114 performs the on switching operation. Accordingly, the reference resistor $R_{ref}$ and the compensation resistor $R_{comp}$ are connected in parallel with each other, and thus, a reference impedance (or resistance) for an output voltage $V_{01}$ from the first output circuit 16 is compensated, and thereby the output voltage of the multi-output power supply device is uniformly maintained.

If a resistor $R_{01}$, for observing the output voltage of the first output circuit 16, has the value represented by Equation 1, then a value of the compensation resistor $R_{comp}$ is determined by Equation 3.

$$R_{comp} = \frac{R_{01}R_{ref}}{\left|\frac{V_{01}}{V_{ref}} - 1\right|R_{ref} - R_{01}} \quad \text{[Equation 3]}$$

The aforementioned multi-output power supply device is used for image forming apparatuses including printers, scanners and multi-function peripherals. In other aspects, other devices that use different voltages among its subcomponents may use the aforementioned multi-output power supply device.

The multi-output power supply device according to an aspect of the present invention can compensate for a voltage error observed by a feedback circuit when power output to one output circuit of multiple output circuits is blocked, and thus, stably control power output to other output circuits of the multiple output circuits.

In FIGS. 3 and 4, the reference resistor $R_{ref}$ is connected between the observation resistors $R_{01}$, $R_{02}$, and a ground. Accordingly, in FIG. 3, the feedback compensation circuit 100A is connected in parallel with the observation resistors $R_{01}$ of the feedback circuit 28. On the other hand, in FIG. 4, the feedback compensation circuit 100B is connected in parallel with the reference resistor $R_{ref}$ of the feedback circuit 28.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. A multi-output power supply device comprising:
   at least two output circuits to output at least two output voltages using input voltage;
   a feedback circuit to feed back the at least two output voltages of the at least two output circuits to control supply of the input voltage; and
   a feedback compensation circuit to compensate for a resistance of the feedback circuit corresponding to a blocked output when an output of one of the at least two output circuits is blocked.

2. The multi-output power supply device of claim 1, further comprising a power switch to block one output power supplied to a system to which a power supply device supplies power among at least two output powers output from a secondary side of a transformer if the system is in a standby mode,
   wherein the feedback compensation circuit compensates for the resistance of the feedback circuit fed back to a switching controller of a primary side power switch of the transformer of an output of the other one of the at least two output circuits that is not blocked to uniformly maintain the output of the other one of the at least two output circuits that is not blocked.

3. The multi-output power supply device of claim 2, wherein the feedback circuit comprises a reference resistance and a resistance corresponding to the other one of the at least two output circuits that is not blocked.

4. The multi-output power supply device of claim 3, wherein the feedback compensation circuit is connected in parallel to the reference resistance or the resistance corresponding to the other one of the at least two output circuits that is not blocked.

5. The multi-output power supply device of claim 4, wherein the feedback compensation circuit comprises:
   a compensation switch; and
   a compensation circuit connected in serial to the compensation switch and connected in parallel to the reference resistance or the resistance corresponding to the other one of the at least two output circuits that is not blocked.

6. The multi-output power supply device of claim 2, wherein the feedback compensation circuit comprises:
   a compensation switch; and
   a compensation circuit connected in serial to the compensation switch.

7. An image forming apparatus comprising:
   an image forming unit for forming image in the image forming apparatus; and
   a multi-output power supply device for supplying a plurality of power with the image forming unit,
   wherein the multi-output power supply device comprises
      at least two output circuits to output at least two output voltages using input voltage;
      a feedback circuit to feed back the at least two output voltages of the at least two output circuits to control supply of the input voltage; and
      a feedback compensation circuit to compensate for a resistance of the feedback circuit corresponding to a blocked output when an output of one of the at least two output circuits is blocked.

8. The image forming apparatus of claim 7, wherein the multi-output power supply device further comprises: a power switch to block one output power supplied to a system to which a power supply device supplies power among at least two output power output from a secondary side of a transformer if the system is in a standby mode,
   wherein the feedback compensation circuit compensates for the resistance of the feedback circuit fed back to a switching controller of a primary side power switch of the transformer of an output of the other one of the at least two output circuits that is not blocked to uniformly maintain the output of the other one of the at least two output circuits that is not blocked.

9. The image forming apparatus of claim 8, wherein the feedback circuit comprises a reference resistance and a resistance corresponding to the other one of the at least two output circuits that is not blocked.

10. The image forming apparatus device of claim 9, wherein the feedback compensation circuit is connected in parallel to the reference resistance or the resistance corresponding to the other one of the at least two output circuits that is not blocked.

11. The image forming apparatus of claim 10, wherein the feedback compensation circuit comprises:
- a compensation switch; and
- a compensation circuit connected in serial to the compensation switch and connected in parallel to the reference resistance or the resistance corresponding to the other one of the at least two output circuits that is not blocked.

12. The image forming apparatus of claim 8, wherein the feedback compensation circuit comprises:
- a compensation switch; and
- a compensation circuit connected in serial to the compensation switch.

13. A method of controlling a plurality of output voltages performed by a multi-output power supply device for generating the plurality of output voltages using input voltage, the method comprising:
- feeding back the plurality of output voltages to control supply of the input voltage; and
- compensating for a resistance of the feedback circuit corresponding to a blocked output when one of the plurality of output voltages is blocked and uniformly maintaining of the plurality of output voltages that are not blocked.

14. The method of claim 13, wherein one of the plurality of output voltages is blocked when a system to which the multi-output power supply device supplies power is in a standby mode,
- wherein the resistance of the feedback circuit is compensated by connecting a predetermined compensation resistance in parallel to one of resistances of the feedback circuit when the system is changed from a normal operation mode to the standby mode.

15. The method of claim 14, wherein the resistances of the feedback circuit comprise an observation resistance used to observe the plurality of output voltages that are not blocked and a reference resistance of the feedback circuit.

16. The method of claim 15, wherein the resistance of the feedback circuit is compensated by connecting the predetermined compensation resistance in parallel to the observation resistance or the reference resistance when the system is changed from the normal operation mode to the standby mode.

17. The method of claim 14, wherein one of the plurality of output voltages is blocked and the predetermined compensation resistance and the resistances of the feedback circuit are connected in parallel to each other by complementarily switching a switch used to block one of the plurality of output voltages and a switch used to connect the predetermined compensation resistance and the resistances of the feedback circuit by using a standby mode signal output from the system.

* * * * *

UNITED STATES PATENT AND TRADEMARK OFFICE
CERTIFICATE OF CORRECTION

| | |
|---|---|
| PATENT NO. | : 8,446,036 B2 |
| APPLICATION NO. | : 13/326881 |
| DATED | : May 21, 2013 |
| INVENTOR(S) | : Jee-hoon Jung |

It is certified that error appears in the above-identified patent and that said Letters Patent is hereby corrected as shown below:

In the Claims:

In Col. 7, Line 1, In Claim 10, delete "apparatus device" and insert -- apparatus --, therefor.

Signed and Sealed this
Fifteenth Day of October, 2013

Teresa Stanek Rea
*Deputy Director of the United States Patent and Trademark Office*